US012036802B2

(12) United States Patent
Park et al.

(10) Patent No.: US 12,036,802 B2
(45) Date of Patent: Jul. 16, 2024

(54) INKJET PRINTING APPARATUS AND CONTROL METHOD THEREOF

(71) Applicant: Genix Corporation, Seongnam-si (KR)

(72) Inventors: Steve Park, Seongnam-si (KR); Kang Seok Park, Anyang-si (KR); Woong Lee, Incheon (KR)

(73) Assignee: Genix Corporation, Seongnam-si (KR)

( * ) Notice: Subject to any disclaimer, the term of this patent is extended or adjusted under 35 U.S.C. 154(b) by 54 days.

(21) Appl. No.: 17/584,132

(22) Filed: Jan. 25, 2022

(65) Prior Publication Data

US 2022/0234374 A1 Jul. 28, 2022

(30) Foreign Application Priority Data

Jan. 27, 2021 (KR) ........................ 10-2021-0011805
Feb. 16, 2021 (KR) ........................ 10-2021-0020698

(51) Int. Cl.
*B41J 25/00* (2006.01)
*B41J 3/407* (2006.01)
(Continued)

(52) U.S. Cl.
CPC .............. *B41J 25/006* (2013.01); *B41J 3/407* (2013.01); *D06P 5/00* (2013.01); *D06P 5/30* (2013.01)

(58) Field of Classification Search
CPC . B41J 2/1714; B41J 2/01; B41J 2/2114; B41J 3/4078; B41J 3/543; B41J 29/377;
(Continued)

(56) References Cited

U.S. PATENT DOCUMENTS 5,774,141 A * 6/1998 Cooper .................. B41J 2/1714
347/93
9,981,474 B2 * 5/2018 Goto ...................... B41J 3/4078
(Continued)

FOREIGN PATENT DOCUMENTS

JP 2007-031888 A 2/2007
JP 2008-075215 A 4/2008
(Continued)

OTHER PUBLICATIONS

Machine Translation of JP-2008075215-A; Produced byJ-PlatPat [JPP] Jun. 10, 2023. (Year: 2023).*
(Continued)

*Primary Examiner* — John Zimmermann
(74) *Attorney, Agent, or Firm* — Knobbe, Martens, Olson & Bear, LLP

(57) ABSTRACT

This application relates to an inkjet printing apparatus. In one aspect, the apparatus includes a main frame and a flat-bed moving in a first direction with respect to the main frame. The apparatus may also include a first printing device located on a movement path of the flat-bed and comprising a first inkjet head for jetting base ink onto a print area of the print medium. The apparatus may further include a second printing device located on the movement path of the flat-bed and comprising a second inkjet head for jetting activator ink onto the print area of the print medium onto which the base ink is jetted. The apparatus may further include at least one processor electrically connected to the flat-bed, the first printing device, and the second printing device and configured to control operations of the flat-bed, the first printing device, and the second printing device.

19 Claims, 7 Drawing Sheets

(51) Int. Cl.
*D06P 5/00* (2006.01)
*D06P 5/30* (2006.01)

(58) Field of Classification Search
CPC ..... B41J 2/21; B41J 3/407; D06P 5/30; D06P 1/44; D06P 5/00
See application file for complete search history.

(56) References Cited

U.S. PATENT DOCUMENTS 10,589,529 B2 * 3/2020 Suzuki ................. B41J 2/16538
10,967,630 B2 * 4/2021 Bernard ................. B41J 11/002
11,633,958 B2 * 4/2023 Kemma ................. B41J 2/1714 347/34
2003/0043246 A1 * 3/2003 Codos ........................ B41J 2/01 347/102
2003/0202039 A1 * 10/2003 Rutland ............... B41J 11/0015 347/37
2007/0060670 A1 * 3/2007 Ellis .......................... D06P 5/30 523/160
2008/0253797 A1 * 10/2008 Sakagami .............. B41J 2/1714 399/92
2009/0174749 A1 * 7/2009 Kemma ................... B41J 3/543 347/37
2011/0032303 A1 * 2/2011 Li .......................... C09D 11/40 524/439
2012/0007916 A1 * 1/2012 Kumagai ............... B41J 2/1714 347/34
2012/0251795 A1 * 10/2012 Okada ...................... B05D 3/12 524/424
2013/0278690 A1 * 10/2013 Saito ...................... C09D 11/40 347/102
2015/0054883 A1 * 2/2015 Okuda ................. C09D 11/322 524/556
2015/0111989 A1 * 4/2015 Kagata ................... C09D 11/40 523/218
2015/0368486 A1 * 12/2015 De Saint-Romain ........................ C09D 11/324 428/209
2021/0047765 A1 * 2/2021 Mor ...................... D06P 1/5221
2021/0130633 A1 * 5/2021 Sabys .................. C09D 11/033
2021/0130636 A1 * 5/2021 Askeland ............. B41M 7/0081

FOREIGN PATENT DOCUMENTS

JP 5720768 B2 5/2015
JP 2018-051823 A 4/2018
KR 10-2015-0128379 A 11/2015
KR 10-2018-0035230 A 4/2018

OTHER PUBLICATIONS

Office Action dated Oct. 27, 2022 from KR Patent Application No. 10-2021-0020698.
International Search Report and Written Opinion in PCT Application No. PCT/KR2022/001277 dated Apr. 28, 2022 in 9 pages.

* cited by examiner

INKJET PRINTING APPARATUS AND CONTROL METHOD THEREOF

CROSS-REFERENCE TO RELATED APPLICATIONS

This application is based on and claims priority under 35 U.S.C. § 119 to Korean Patent Application No. 10-2021-0011805, filed on Jan. 27, 2021, and Korean Patent Application No. 10-2021-0020698, filed on Feb. 16, 2021, in the Korean Intellectual Property Office, the disclosures of each of which are incorporated by reference herein in their entirety.

BACKGROUND

Technical Field

One or more embodiments relate to inkjet printing apparatuses and the control methods thereof, and more particularly, to inkjet printing apparatuses capable of printing an image on a print medium without a pre-treatment by dualizing ink jetting, and control methods thereof.

Description of Related Technology

Inkjet printing apparatuses print desired images in a print area of a print medium by jetting printing ink print medium through an inkjet head onto a print medium. In detail, an inkjet printing apparatus may print an image having a certain color on a surface of a print medium by jetting an ink droplet of a fine size at a desired position on the print medium through an inkjet head.

An existing inkjet printing apparatus has been mainly used to print an image on a print medium such as paper, film, and the like. Recently, applications of inkjet printing apparatuses have gradually expanded, and thus, inkjet printing apparatuses are used for printing images on fiber woven fabrics or clothing.

For example, an inkjet printing apparatus may print an image such as artwork, text, logo, etc. on fabric or clothing by jetting ink of a desired color onto fabrics or clothing.

SUMMARY

When ink is directly jetted onto fabric or clothing through an inkjet printing apparatus, a bonding force between ink and fabric or clothing (or 'fastness') is insufficient so that print quality may deteriorate.

For example, when ink is jetted directly onto the surface of fabric or clothing, the bonding force between the ink and the fabric or clothing is insufficient, and thus, the jetted ink may flow on or smear the fabric or clothing so that the quality of the printed image may be deteriorated.

Accordingly, it is common to perform a pre-treatment before jetting ink through an inkjet printing apparatus as a method of increasing a bonding force between fabric or clothing and ink.

Pre-treatment refers to a process of coating chemicals on the surface of fabric or clothing before jetting ink so that ink for printing may adhere well to the fabric or clothing, and it is common to form a thin film layer on the surface of fabric or clothing by drying the pre-treatment chemicals at a certain temperature after applying the pre-treatment chemicals to the surface of fabric or clothing, or by spraying the pre-treatment chemicals on the surface of fabric or clothing.

However, according to the related art, when a pre-treatment is performed, pre-treatment chemicals may be wasted because the pre-treatment chemicals need to be applied to an area larger than a print area or to the entire surface of fabric or clothing, and the wasted pre-treatment chemicals may cause environmental problems.

Accordingly, one or more embodiments provide an inkjet printing apparatus capable of printing images through a chemical bond between base ink and activator ink by jetting the base ink and the activator ink directly onto the surface of clothing or fabric without a separate pre-treatment, and the control methods thereof.

The description of the following embodiments should not be construed as limiting the scope of rights, and contents that can be easily inferred by those skilled in the art should be construed as belonging to the scope of the present specification.

Additional aspects will be set forth in part in the description which follows and, in part, will be apparent from the description, or may be learned by practice of the presented one or more embodiments of the disclosure.

According to one or more embodiments, an inkjet printing apparatus includes a main frame, a flat-bed having at least one region on which a print medium is placed, the flat-bed moving in a first direction with respect to the main frame, a first printing device located on a movement path of the flat-bed and comprising a first inkjet head for jetting base ink onto a print area of the print medium, a second printing device located on the movement path of the flat-bed and comprising a second inkjet head for jetting activator ink onto the print area of the print medium onto which the base ink is jetted, and an at least one processor electrically connected to the flat-bed, the first printing device, and the second printing device and configured to control operations of the flat-bed, the first printing device, and the second printing device.

In an embodiment, an image may be printed in the print area of the print medium by a chemical bond between the base ink and the activator ink.

In an embodiment, the second printing device may be arranged apart from the first printing device in the first direction.

In an embodiment, the first printing device may further include a first support to support the first inkjet head, and a first motor to move the first support in the second direction across the first direction.

In an embodiment, the second printing device may further include a second support to support the second inkjet head, and a second motor to move the second support in the second direction across the second direction.

In an embodiment, the inkjet printing apparatus may further include a first discharge path located upstream of the first printing device, and a first fan discharging mist, which occurs in a process in which the first inkjet head jets the base ink, to the outside of the inkjet printing apparatus, through the first discharge path.

Furthermore, the inkjet printing apparatus may further include a second fan located between the first printing device and the second printing device, and discharging the mist, which occurs in the process in which the first inkjet head jets the base ink, to the outside of the inkjet printing apparatus.

In another embodiment, the inkjet printing apparatus may further include a second discharge path located upstream of the second printing device, and a third fan discharging mist, which occurs in a process in which the second inkjet head jets the activator ink, to the outside of the inkjet printing apparatus, through the second discharge path.

Furthermore, the inkjet printing apparatus may further include a fourth fan located downstream of the second printing device, and discharging the mist, which occurs in the process in which the second inkjet head jets the activator ink, to the outside of the inkjet printing apparatus.

In an embodiment, at least one processor may include a first processor located in at least one region of the first printing device, and configured to control the operation of the first printing device, the first fan, and the second fan, and a second processor located in at least one region of the second printing device, and configured to control operations of the second printing device, the third fan, and the fourth fan.

In an embodiment, the first processor may be further configured to generate a flow of air toward the first processor by controlling the operation of the first fan or the second fan based on a certain time interval.

In another embodiment, the second processor may be further configured to generate a flow of air toward the second processor by controlling the operation of the third fan or the fourth fan based on a certain time interval.

In an embodiment, the inkjet printing apparatus may further include a first cover member to protect the first processor, and a second cover member to protect the second processor.

In another embodiment, the inkjet printing apparatus may further include a roller located between the first printing device and the second printing device and pressing the print area of the print medium onto which the base ink is jetted.

According to one or more embodiments, a method of controlling an inkjet printing apparatus includes an operation of moving a flat-bed having one region on which a print medium is placed to a first position, an operation of moving the flat-bed moved to the first position along a first direction, an operation of reciprocating along a second direction perpendicular to the first direction and jetting the base ink onto a print area of the print medium through a first printing device including a first inkjet head, and an operation of reciprocating along the second direction and jetting activator ink onto the print area of the print medium onto which the base ink is jetted through a second printing device including a second inkjet head.

In an embodiment, the method may further include, before the jetting of the activator ink onto the print area of the print medium, an operation pressing through a roller located between the first printing device and the second printing device, the print area of the print medium onto which the base ink is jetted.

In an embodiment, the method may further include discharging mist occurring in a process in which the first printing device jets the base ink, to the outside of the inkjet printing apparatus, by controlling an operation of a first fan located upstream of the first printing device or an operation of a second fan located downstream of the first printing device.

In an embodiment, the method may further include discharging mist occurring in a process in which the second printing device jets the activator ink, to the outside of the inkjet printing apparatus, by controlling an operation of a third fan located upstream of the second printing device or an operation of a fourth fan located downstream of the second printing device.

BRIEF DESCRIPTION OF THE DRAWINGS

The above and other aspects, features, and advantages of certain one or more embodiments of the disclosure will be more apparent from the following description taken in conjunction with the accompanying drawings.

DETAILED DESCRIPTION

Figure 1:
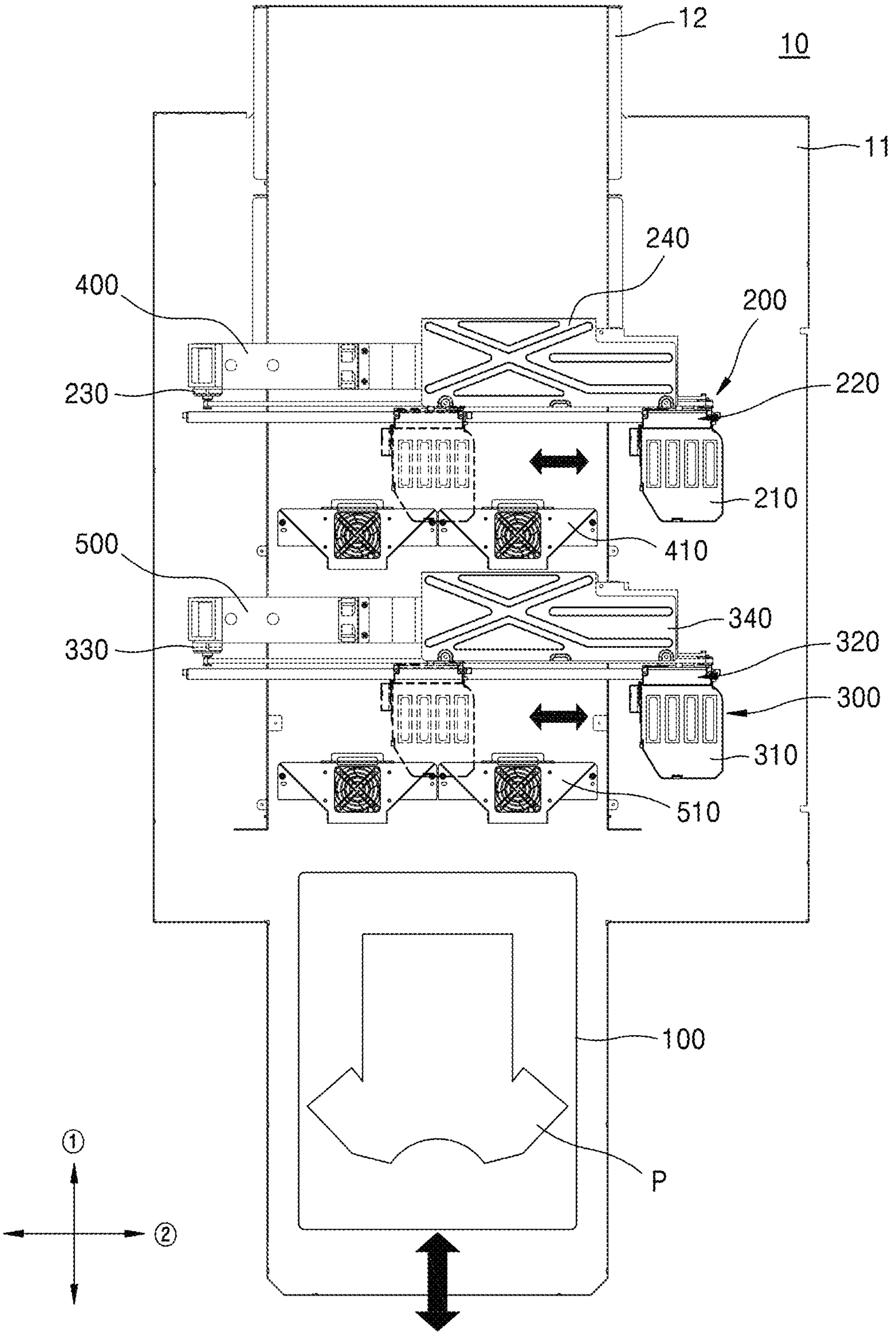
FIG. 1 is a view of an inkjet printing apparatus according to an embodiment.

Reference will now be made in detail to one or more embodiments, examples of which are illustrated in the accompanying drawings, wherein like reference numerals refer to like elements throughout. In this regard, the present one or more embodiments may have different forms and should not be construed as being limited to the descriptions set forth herein. Accordingly, the one or more embodiments are merely described below, by referring to the figures, to explain aspects of the present description. As used herein, the term “and/or” includes any and all combinations of one or more of the associated listed items. Expressions such as “at least one of,” when preceding a list of elements, modify the entire list of elements and do not modify the individual elements of the list.

The terms used in the disclosure are those selected from currently widely used general terms in consideration of functions in the disclosure. However, the terms may vary according to an engineer’s intention, precedents, or advent of new technology. Also, for special cases, terms selected by the applicant are used, in which meanings the selected terms are described in detail in the description section. Accordingly, the terms used in the disclosure are defined based on the meanings of the terms and the contents discussed throughout the specification, not by simple meanings thereof.

When a part may “include” a certain constituent element, unless specified otherwise, it may not be construed to exclude another constituent element but may be construed to further include other constituent elements. Terms such as “ . . . unit,” “ . . . module,” etc. stated in the specification may signify a unit to process at least one function or operation and the unit may be embodied by hardware, software, or a combination of hardware and software.

As used in the disclosure, when an expression such as “at least any one of” is arranged before a list of constituent elements, the expression modifies the entire constituent elements rather than each arranged constituent element. For example, in the disclosure, expressions such as “at least one of a, b, or c” may denote “a”, “b”, “c”, “a and b”, “a and c”, “b and c”, “all of a, b, and c”, or modifications thereof.

In the disclosure, an “inkjet printing apparatus” may refer to a device that can print an image on a print medium in a manner of discharging fine-sized ink particles for printing to a desired position of print medium. Furthermore, the inkjet printing apparatus may be referred to as an "image forming apparatus."

One or more embodiments will be described below in detail with reference to the attached drawings so to be clearly understood by one skilled in the art to which the present disclosure belongs. However, the embodiments may be implemented in various forms and are not limited to the examples described below.

FIG. 1 is a view of an inkjet printing apparatus 10 according to an embodiment.

Referring to FIG. 1, the inkjet printing apparatus 10 according to an embodiment may include a main frame 11, a flat-bed 100, a first printing device 200, and a second printing device 300.

The main frame 11 may provide a space in which the constituent elements of the inkjet printing apparatus 10 are arranged, and support the constituent elements of the inkjet printing apparatus 10.

According to an embodiment, the flat-bed 100, the first printing device 200, and/or the second printing device 300 may be arranged in at least one region of the main frame 11, and constituent elements for operating the flat-bed 100, the first printing device 200, and/or the second printing device 300 may be arranged in the main frame 11.

Although not illustrated in the drawings, for example, a driving portion (not shown) for moving the flat-bed 100, a power supply, and/or an electrical connection device, for example, electric wires or FPCB, for electrically connecting the constituent elements of the inkjet printing apparatus 10 may be arranged in the main frame 11, but the disclosure is not limited thereto.

The flat-bed 100 may reciprocate in a predetermined direction with respect to the main frame 11, and a print medium P on which an image is printed by the inkjet printing apparatus 10 may be arranged in at least one region of the flat-bed 100.

In an embodiment, the flat-bed 100 may be reciprocated along a predetermined path by the driving portion located in the main frame 11. The driving portion may move the flat-bed 100, for example, by a rail or rack and pinion method, but the disclosure is not limited thereto.

According to an embodiment, the flat-bed 100 may include a print side having a flat surface, and the print medium P may be placed on the print side of the flat-bed 100 and may reciprocate with the flat-bed 100 in a predetermined direction. For example, the flat-bed 100 may reciprocate in a first direction, for example, direction θ of FIG. 1, with respect to the main frame 11, and the print medium P may also reciprocate in the first direction with respect to the main frame 11, corresponding to the movement of the flat-bed 100.

While reciprocating in the first direction corresponding to the movement of the flat-bed 100, the print medium P may pass through the first printing device 200 and/or the second printing device 300 of the inkjet printing apparatus 10. In the process, ink is jetted onto the print medium P so that an image may be printed in at least one region of the print medium P.

The print medium P may include at least one of fabrics and clothing woven with natural fiber or synthetic fiber, but the type of the print medium P is not limited thereto.

The first printing device 200 may be located on a movement path of the flat-bed 100 and/or the print medium P, and base ink may be jetted onto the print medium P.

For example, when the print medium P arranged on the print side of the flat-bed 100 reaches the first printing device 200, the first printing device 200 may jet the base ink onto a print area of the print medium P. As the base ink jetted on the surface of the print medium P is chemically bondable to other ink, for example, activator ink, various colors may be expressed in the print area, and a detailed description thereof is described below.

In the disclosure, the base ink may mean ink that is jetted onto the print area of the print medium P and serves as a basis for color expression, and such expression may be used below as the same meaning. Furthermore, the base ink is ink of a transparent color, which is distinguished from existing color ink of an opaque or translucent color.

The base ink may include, for example, at least one of nitric acid calcium (calcium nitrate or calcium nitrate tetrahydrate), water, or a surfactant, but the component of the base ink is not limited thereto.

According to an embodiment, the first printing device 200 may include a first inkjet head 210, a first support 220, and a first motor 230, in order to jet the base ink onto the print medium P.

The first inkjet head 210 may include a base ink reservoir (not shown) for storing the base ink and at least one jetting nozzle (not shown) that is fluid connected to the base ink reservoir.

In an embodiment, the at least one jetting nozzle of the first inkjet head 210 may be arranged in a direction toward the print medium P, and may jet the base ink toward the print medium P reaching the first printing device 200.

The first support 220 may perform supporting the first inkjet head 210 arranged in at least one region of the first support 220, and reciprocate along a predetermined path by the power generated from the first motor 230.

For example, the first support 220 may reciprocate along a second direction, for example, direction ② of FIG. 1, crossing the first direction, for example, the direction ① of FIG. 1, by the power generated by the first motor 230, and the first inkjet head 210 supported by the first support 220 may also reciprocate along the second direction corresponding to the movement of the first support 220. The second direction may mean a direction substantially perpendicular to the first direction, but the disclosure is not limited thereto.

In other words, the first printing device 200 may reciprocate the first inkjet head 210 in the second direction through the above-described first support 220 and first motor 230, and thus, the first printing device 200 may jet the base ink at a desired position on the surface of the print medium P that moves along the first direction.

The second printing device 300 may be located on the movement path of the flat-bed 100 and/or the print medium P, and may jet the activator ink toward the print medium P that has passed through the first printing device 200.

According to an embodiment, the second printing device 300 may be arranged apart from the first printing device 200 in the first direction, and when the print medium P that has passed through the first printing device 200 reaches the second printing device 300, the second printing device 300 may jet the activator ink onto the print area of the print medium P.

The activator ink jetted from second printing device 300 onto the print area of the print medium P may be chemically bondable to the base ink that is already jetted onto the print area of the print medium P, and thus, an image may be printed on the print area of the print medium P.

In the disclosure, the activator ink may mean ink that can express a color through the chemical bond to the base ink, and the expression may be used below as the same meaning. Furthermore, the activator ink may include activator ink of a white color and activator ink of CYMK colors, which is chemically bondable to the base ink.

The activator ink may include at least one of, for example, titan dioxide, a surfactant, an aqueous ammonia solution, acetone, water, solvent, for example, 5-chloro-2-methyl-2H-isothiazol-3-one, 2-methyl-2H-isothiazol-3-one, diethylene glycol, diethylene glycol monobutyl ether, and/or 2-dimethylaminoethanol, mixed pigment, for example, carbon black, C.I. pigment blue 15:3, magenta pigment, and/or yellow pigment, but the component of the activator ink is not limited thereto.

In the disclosure, the base ink and the activator ink may be distinguished from the ink of white or CYMK colors that has been used to express a color by being jetted onto a pre-treated print medium. For example, the base ink and the activator ink may mean ink that do not have sufficient color development or a sufficient fixing or bonding force to the print medium P, but have clear color development and strong adhesive or fixing force to the print medium P when the base ink and the activator ink are chemically bonded to each other.

When an image is printed on a print medium, for example, fabric or clothing, through an existing inkjet printing apparatus, it is common to perform a pre-treatment on the surface of a print medium before printing in order to increase a bonding force between the print medium and ink.

The pre-treatment may be performed by a method of coating a partial area of a print medium with pre-treatment chemicals and then drying the print medium at a predetermined temperature, or coating the entire surface of a print medium with pre-treatment chemicals by spraying and the like. In the existing pre-treatment, pre-treatment chemicals are coated in an area larger than the print area so that the pre-treatment chemicals may be wasted, and the pre-treatment chemicals wasted in the pre-treatment may cause an environmental problem.

Reversely, in the inkjet printing apparatus 10 according to an embodiment, as an image is printed through a chemical bond between the base ink and the activator ink that are jetted through the first printing device 200 and/or the second printing device 300, without performing a pre-treatment, ink may be firmly fixed or adhered on the print medium P.

In other words, in the inkjet printing apparatus 10 according to an embodiment, as a desired image may be firmly printed on the print medium P without performing a pre-treatment, a printing process may be shortened, and the waste of pre-treatment chemicals that may occur in the pre-treatment may be reduced.

According to an embodiment, the second printing device 300 may include a second inkjet head 310, a second support 320, and a second motor 330 in order to jet the activator ink onto the print medium P.

The second inkjet head 310, the second support 320, and the second motor 330 of the second printing device 300 may be arranged apart a predetermined distance from the first printing device 200 to prevent an unintended chemical bond between the base ink and the activator ink.

The second inkjet head 310 may include an activator ink reservoir (not shown) for storing the activator ink and at least one jetting nozzle (not shown) that is fluid connected to the activator ink reservoir.

In an embodiment, the at least one jetting nozzle of the second inkjet head 310 may be arranged in a direction toward the print medium P and may jet the activator ink onto the print medium P that has passed through the first printing device 200 and reaches the second printing device 300.

The second support 320 may support the second inkjet head 310 arranged in at least one region of the second support 320, and reciprocate along a predetermined path by the power generated from the second motor 330.

For example, the second support 320 may reciprocate along the second direction substantially perpendicular to the movement direction of the flat-bed 100 similar to the first support 220 by the power generated by the second motor 330, and the second inkjet head 310 supported by the second support 320 may also reciprocate along the second direction corresponding to the movement of the second support 320.

In other words, the second printing device 300 may reciprocate the second inkjet head 310 in the second direction through the above-described second support 320 and second motor 330, and thus, the second printing device 300 may print an image on the print medium P by jetting the activator ink at a desired position on the surface of the print medium P moving along the first direction.

The inkjet printing apparatus 10 according to an embodiment may jet the base ink through the first printing device 200 and the activator ink through the second printing device 300 apart from the first printing device 200, thereby dualizing an ink jetting process that is essential to image printing.

The inkjet printing apparatus 10 may reduce unintended interaction, for example, a chemical bond, between the inks by a droplet splash phenomenon that may occur in a process of jetting the base ink and/or the activator ink, through the dualization of the ink jetting process, thereby improving print quality.

When an image is printed on dark clothing or fabric, the inkjet printing apparatus 10 according to an embodiment may jet the base ink onto the print area of the print medium P through the first printing device 200, and then white activator ink through the second printing device 300. The jetted white activator ink is chemically bonded to the base ink previously jetted onto a print area of clothing or fabric to form a background.

After the background is formed by the bonding of the white activator ink and the base ink, the second printing device 300 may jet activator ink of CYMK colors, and the activator ink of CYMK colors may be chemically bonded to the base ink jetted onto the print area of the print medium P so that an image having a certain color may be printed on the print area of the print medium P.

In an embodiment, the inkjet printing apparatus 10 may further include a side surface support frame 12 arranged in at least one region of the main frame 11 and supporting the first printing device 200 and/or the second printing device 300.

In the printing process of the inkjet printing apparatus 10, as the first inkjet head 210 and/or the second inkjet head 310 reciprocates along the second direction with respect to the main frame 11, shaking may occur in the inkjet printing apparatus 10, and thus, the base ink and/or the activator ink is not jetted onto a desired position on the print medium P so that print quality may be deteriorated.

The side surface support frame 12, which is arranged in or coupled to the at least one region of the main frame 11, may support the first printing device 200 and/or the second printing device 300, and thus, shaking generated due to the movement of the first inkjet head 210 and/or the second inkjet head 310 may be reduced, thereby reducing the deterioration of print quality due to the shaking of the inkjet printing apparatus 10.

In an embodiment, the side surface support frame 12 may be arranged in one region of the main frame 11 adjacent to the movement path of the flat-bed 100. However, once the side surface support frame 12 is able to support the first printing device 200 and/or the second printing device 300, the position of the side surface support frame 12 may vary according to an embodiment.

The inkjet printing apparatus 10 according to an embodiment may further include a first discharge path 400, a first fan (not shown), and/or a second fan 410, to discharge mist occurring in the base ink jetting process of the first printing device 200 to the outside of the inkjet printing apparatus 10.

For example, base ink mist may occur through the first inkjet head 210 of the first printing device 200 in the base ink jetting process, or scattering of foreign materials around the first inkjet head 210 may occur. At least part of the base ink mist and/or the foreign materials that have occurred may reach the second inkjet head 310.

The base ink mist and/or the foreign materials reaching the second inkjet head 310 may be chemically bonded to the activator ink, and a resultant of the chemical bond, for example, a deposit, may deteriorate ink jetting performance by clogging the jetting nozzle of the second inkjet head 310, or cause malfunction of the second inkjet head 310.

The first discharge path 400 and the first fan may be located upstream of the first printing device 200 and may discharge the base ink mist occurring in the base ink jetting process of the first printing device 200 and/or the foreign materials located around the first printing device 200 to the outside of the inkjet printing apparatus 10.

In the disclosure, the upstream of the first printing device 200 may mean a region where the flat-bed 100 is located before the flat-bed 100 reaches the first printing device 200 in the movement path of the flat-bed 100, and the downstream of the first printing device 200 may mean a region where the flat-bed 100 is located after the flat-bed 100 passes through the first printing device 200 in the movement path of the flat-bed 100. For example, the downstream of the first printing device 200 may mean a region located between the first printing device 200 and the second printing device 300.

The first discharge path 400 may include an inlet through which the base ink mist and/or the foreign materials flows into the first discharge path 400 and an outlet through which the base ink mist and/or the foreign materials flowing into the first discharge path 400 are discharged to the outside of the inkjet printing apparatus 10.

The first fan may be arranged inside the first discharge path 400 and may generate a flow of air to discharge the base ink mist and/or the foreign materials to the outside of the inkjet printing apparatus 10. For example, due to the flow of air generated by the first fan, the base ink mist and/or the foreign materials around the first printing device 200 may flow into the first discharge path 400 and move along the first discharge path 400, and then, may be discharged through the outlet to the outside of the inkjet printing apparatus 10.

According to an embodiment, the first discharge path 400 may further include a filer (not shown) for filtering at least part of the base ink mist and/or the foreign materials flowing into the first discharge path 400.

The amount of the base ink mist and/or the foreign materials discharged to the outside of the inkjet printing apparatus 10 by the filter located in the first discharge path 400 may be reduced, and thus, a situation in which a user or operator inhales the base ink mist and/or the foreign materials may be reduced.

The second fan 410 may be located downstream of the first printing device 200 and may generate the flow of air to discharge the base ink mist and/or nearby foreign materials occurring in the base ink jetting process of the first printing device 200 to the outside of the inkjet printing apparatus 10.

For example, the second fan 410 may be located between the first printing device 200 and the second printing device 300 and may generate the flow of air to allow the base ink mist and/or nearby foreign materials not to move in a direction toward the second printing device 300, and to move in a direction toward the outside of the inkjet printing apparatus 10.

In other words, the inkjet printing apparatus 10 according to an embodiment may prevent, through the above-described first discharge path 400, first fan, and/or second fan 410, the deterioration of print quality or the malfunction of the inkjet printing apparatus 10 due to the base ink mist or foreign materials occurring in the base ink jetting process.

Furthermore, the inkjet printing apparatus 10 according to an embodiment may further include a second discharge path 500, a third fan (not shown), and/or a fourth fan 510 to discharge mist occurring in an activator ink jetting process of the second printing device 300 to the outside of the inkjet printing apparatus 10.

Similar to the base ink jetting process, the scattering of activator ink mist or nearby foreign materials in the second inkjet head 310 may be generated in the activator ink jetting process through the second inkjet head 310 of the second printing device 300.

The activator ink mist and/or the foreign materials may reach the first inkjet head 210 and may be chemically bonded to the base ink, and a resultant of the chemical bond may clog the jetting nozzle of the first inkjet head 210 to deteriorate ink jetting performance or cause malfunction of the first inkjet head 210.

The second discharge path 500 and the third fan may be located upstream of the second printing device 300 and may discharge activator ink mist occurring in the base ink jetting process of the second printing device 300 and/or foreign materials around the second printing device 300 to the outside of the inkjet printing apparatus 10.

In the disclosure, the upstream of the second printing device 300 may mean a region in the movement path of the flat-bed 100 where the flat-bed 100 is located before the flat-bed 100 reaches the second printing device 300, and the downstream of the second printing device 300 may mean a region in the movement path of the flat-bed 100 where the flat-bed 100 is located after the flat-bed 100 passes through the second printing device 300.

The second discharge path 500 may include an inlet through which activator ink mist and/or foreign materials flow into the second discharge path 500 and an outlet through which the activator ink mist and/or the foreign materials flowing into the second discharge path 500 is discharged to the outside of the inkjet printing apparatus 10.

The third fan may be arranged inside the second discharge path 500 and may generated the flow of air to discharge the activator ink mist and/or the foreign materials to the outside of the inkjet printing apparatus 10. For example, due to the flow of air generated by the third fan, the activator ink mist and/or the foreign materials around the second printing device 300 may flow into the second discharge path 500 and move along the second discharge path 500, and then, may be discharged, through the outlet, to the outside of the inkjet printing apparatus 10.

In other words, the second discharge path 500 and the third fan may prevent the mist and/or the foreign materials occurring in the activator ink jetting process from reaching the first printing device 200. Accordingly, an unintended chemical bond occurring between the base ink and the activator ink mist or foreign materials may be reduced.

According to an embodiment, the second discharge path 500 may further include a filter (not shown) for filtering at least part of the activator ink mist and/or the foreign materials flowing into the second discharge path 500.

The amount of the activator ink mist and/or the foreign materials discharged to the outside of the inkjet printing apparatus 10 by the filter located in the second discharge path 500 may be reduced, and thus, a situation in which a user or operator inhales the base ink mist and/or the foreign materials may be reduced.

The fourth fan 510 may be located downstream of the second printing device 300, and may generate the flow of air to discharge the activator ink mist and/or nearby foreign materials occurring in the activator ink jetting process of the second printing device 300 to the outside of the inkjet printing apparatus 10.

For example, the fourth fan 510 may generate the flow of air in a direction toward the outside of the inkjet printing apparatus 10, and thus, the activator ink mist and/or the foreign materials occurring from the second printing device 300 may be discharged to the outside of the inkjet printing apparatus 10.

In other words, the inkjet printing apparatus 10 according to an embodiment may prevent the deterioration of print quality or malfunction of the inkjet printing apparatus 10 due to the activator ink mist or the foreign materials occurring in the activator ink jetting process, through the above-described second discharge path 500, third fan, and/or fourth fan 510.

The inkjet printing apparatus 10 according to an embodiment may further include at least one processor for controlling the overall operation of the inkjet printing apparatus 10.

The at least one processor may be electrically connected to the flat-bed 100, the first printing device 200, the second printing device 300, the first fan, the second fan 410, the third fan, and/or the fourth fan 510, and may control the overall operation of the inkjet printing apparatus 10 to print an image on the print medium P.

In one example, the at least one processor may control the movement of the flat-bed 100 by controlling the operation of the driving portion arranged in the main frame 11.

In another example, the at least one processor may control the movements of the first inkjet head 210 and/or the second inkjet head 310 by controlling the operations of the first motor 230 and/or the second motor 330. Accordingly, the first inkjet head 210 and/or the second inkjet head 310 may jet inks to desired positions on the print medium P.

According to an embodiment, at least one processor may include a first processor electrically connected to the first printing device 200, the first fan, and/or the second fan 410 and controlling the operations of the first printing device 200, the first fan, and/or the second fan 410 and a second processor electrically connected to the second printing device 300, the third fan, and/or the fourth fan 510 and controlling the operations of the second printing device 300, the third fan, and/or the fourth fan 510.

In an embodiment, the first processor may be located in a region of the first printing device 200 and may control the ink jetting of the first inkjet head 210 and/or the operation of the first motor 230. Furthermore, the first processor, by controlling the operations of the first fan and/or the second fan 410, may discharge the mist and/or the foreign materials occurring when the first printing device 200 jets the base ink, to the outside of the inkjet printing apparatus 10.

In another embodiment, the second processor may be located in a region of the second printing device 300 and may control the ink jetting of the second inkjet head 310 and/or the operation of the second motor 330. Furthermore, the second processor, by controlling the operations of the third fan and/or the fourth fan 510, may discharge the mist and/or the foreign materials occurring when the second printing device 300 jets the activator ink, to the outside of the inkjet printing apparatus 10.

The inkjet printing apparatus 10 according to an embodiment may further include a first cover 240 to protect the first processor and/or a second cover 340 to protect the second processor.

The first cover 240 may be arranged to surround the first processor and may prevent part of ink from splashing in a direction toward the first processor in the base ink jetting process. Similarly, the second cover 340 may be arranged to surround the second processor and may prevent part of ink from splashing in a direction toward the second processor in the activator ink jetting process.

When part of ink splashes in a direction toward the first processor or the second processor in the base ink or activator ink jetting process, the splashed ink may cause malfunction or breakdown of the first processor and/or the second processor.

The inkjet printing apparatus 10 according to an embodiment may prevent or block the ink from splashing in a direction toward the first processor or the second processor by using the first cover 240 and/or the second cover 340, and thus, the malfunction to breakdown of the first processor and/or the second processor may be prevented.

Figure 2:
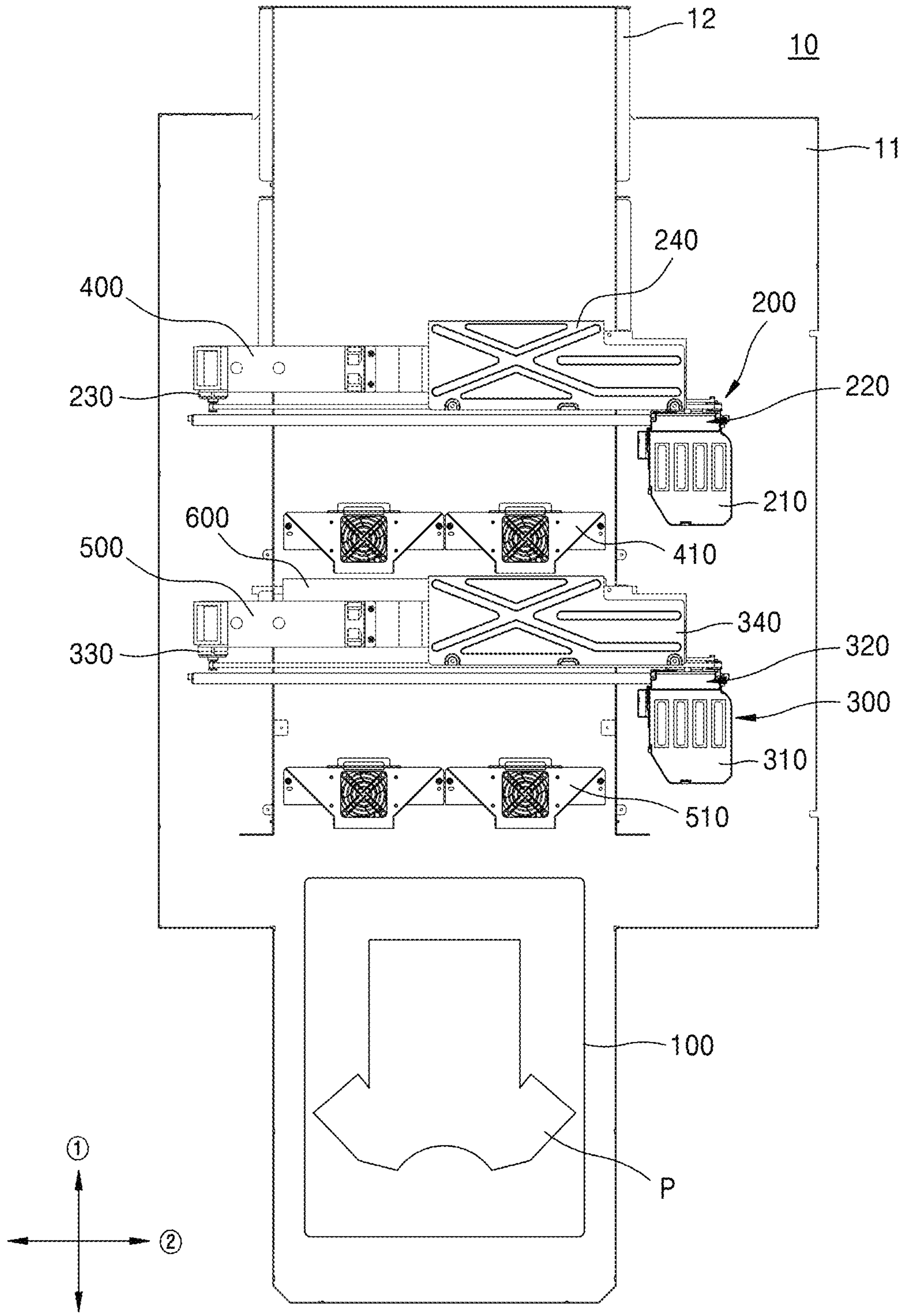
FIG. 2 is a view of an inkjet printing apparatus according to another embodiment.

FIG. 2 is a view of the inkjet printing apparatus 10 according to another embodiment.

Referring to FIG. 2, the inkjet printing apparatus 10 according to another embodiment may include the main frame 11, the flat-bed 100, the first printing device 200, the second printing device 300, the first discharge path 400, the first fan (not shown), the second fan 410, the second discharge path 500, the third fan (not shown), the fourth fan 510, and a roller 600.

The inkjet printing apparatus 10 according to another embodiment is substantially the same as the inkjet printing apparatus 10 of FIG. 1, except the roller 600, and a redundant description thereof is omitted.

The roller 600 may be arranged on the movement path of the flat-bed 100, and when the flat-bed 100 passes through the roller 600, may press the print medium P arranged on the print side of the flat-bed 100.

According to an embodiment, the roller 600 may be located between the first printing device 200 and the second printing device 300, and may press the print medium P that has passed through the first printing device 200. In a process in which the print medium P passes through the first printing device 200, the base ink may be jetted onto the print area of the print medium P, and the roller 600 may press the print area of the print medium P where the base ink is jet.

As the roller 600 presses the print area of the print medium P onto which the base ink is jetted, the print area of the print medium P may be kept flat until the activator ink is jetted, and thus, the print quality of the inkjet printing apparatus 10 may be improved.

Furthermore, as the roller 600 presses the print area of the print medium P onto which the base ink is jetted, the base ink jetted from the first printing device 200 may be firmly fixed on the print area of the print medium P, so that a bonding force or fastness between the ink and the print medium P may be improved.

Although not illustrated in the drawings, according to another embodiment, the roller 600 may be located upstream of the first printing device 200 and may press the print area of the print medium P onto which the base ink is jetted.

In an embodiment, at least one processor of the inkjet printing apparatus 10 may move the flat-bed 100 that has passed through the first printing device 200 in a direction back toward the upstream of the first printing device 200.

In the process in which the flat-bed 100 moves back toward the upstream of the first printing device 200 after passing through the first printing device 200, the print medium P arranged on the flat-bed 100 may pass through the roller 600 located upstream of the first printing device 200. In the process in which the print medium P passes through the roller 600, the roller 600 may press the print area of the print medium P, and thus, the base ink jetted from the first printing device 200 may be firmly fixed on the print area.

The print medium P that has passed through the roller 600 may pass through the first printing device 200 again under the control of at least one processor, and then move in the direction toward the second printing device 300. In other words, by pressing the print area of the print medium P using the above-described roller 600 before jetting the activator ink, the inkjet printing apparatus 10 may increase image the fastness of the base ink and the print medium P, which serves as a basis of printing, and improve print quality.

In the following description, a method of controlling the inkjet printing apparatus 10 to print an image on the print medium P is described in detail with reference to FIGS. 3 to 7.

Figure 3:
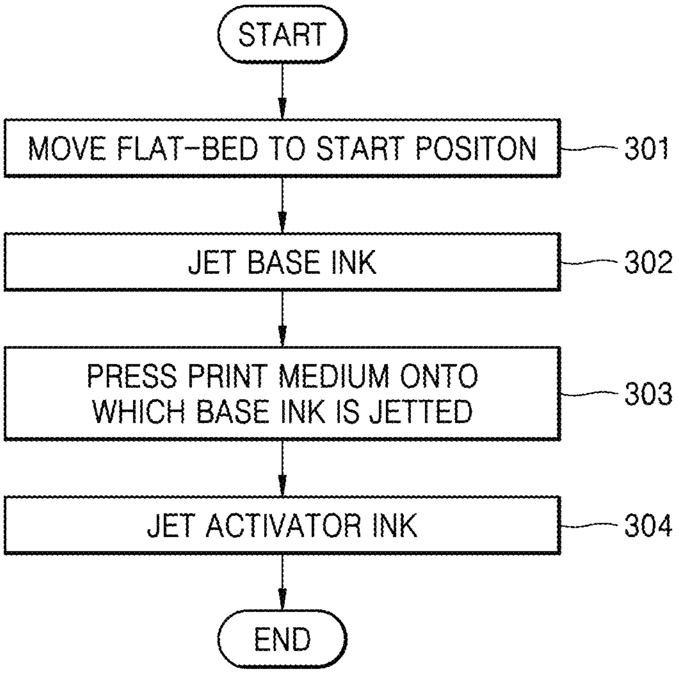
FIG. 3 is a flowchart of a method of controlling an inkjet printing apparatus, according to an embodiment.
Figure 4:
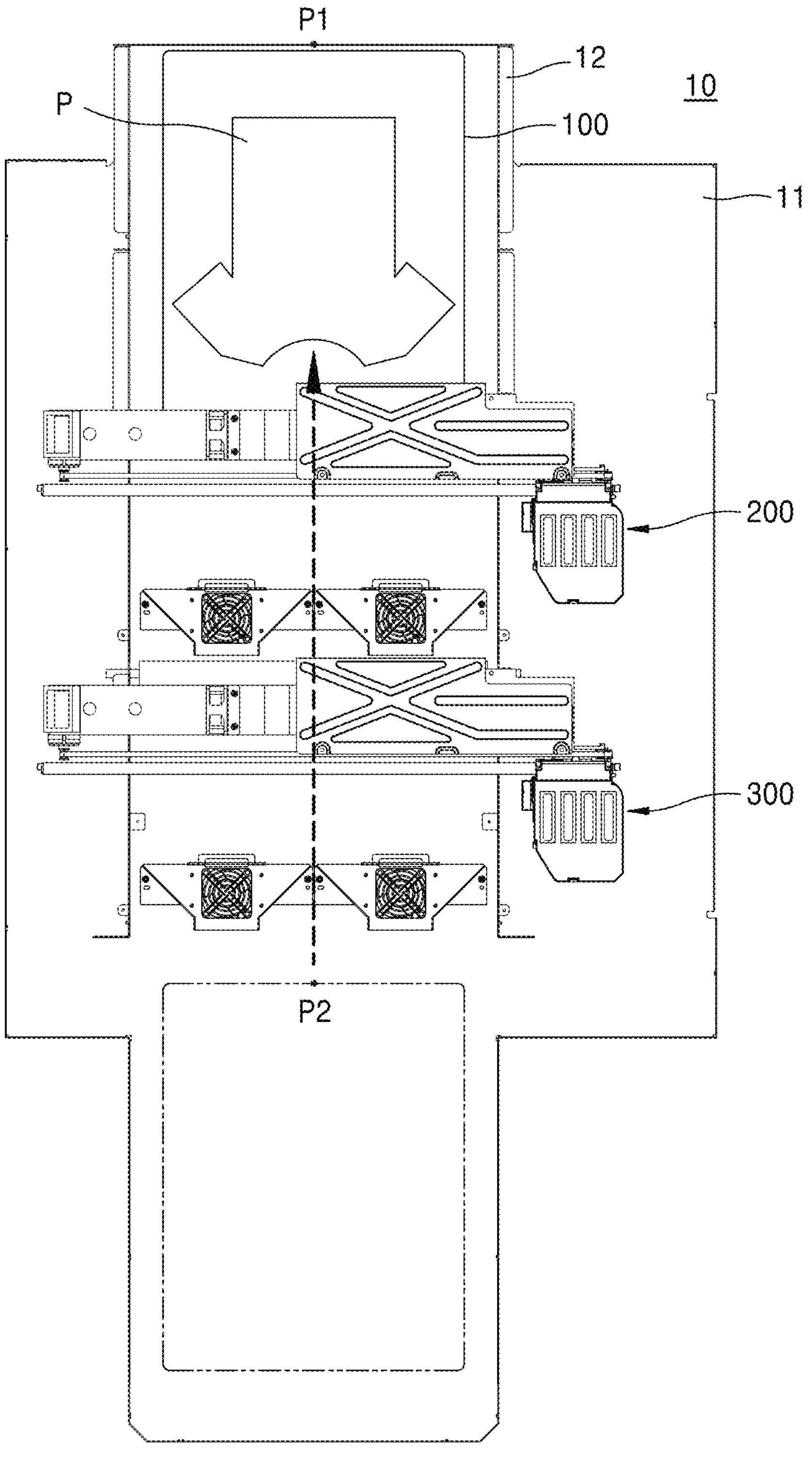
FIG. 4 is a view for explaining an operation of moving a flat-bed to a start position in an inkjet printing apparatus, according to an embodiment.
Figure 5:
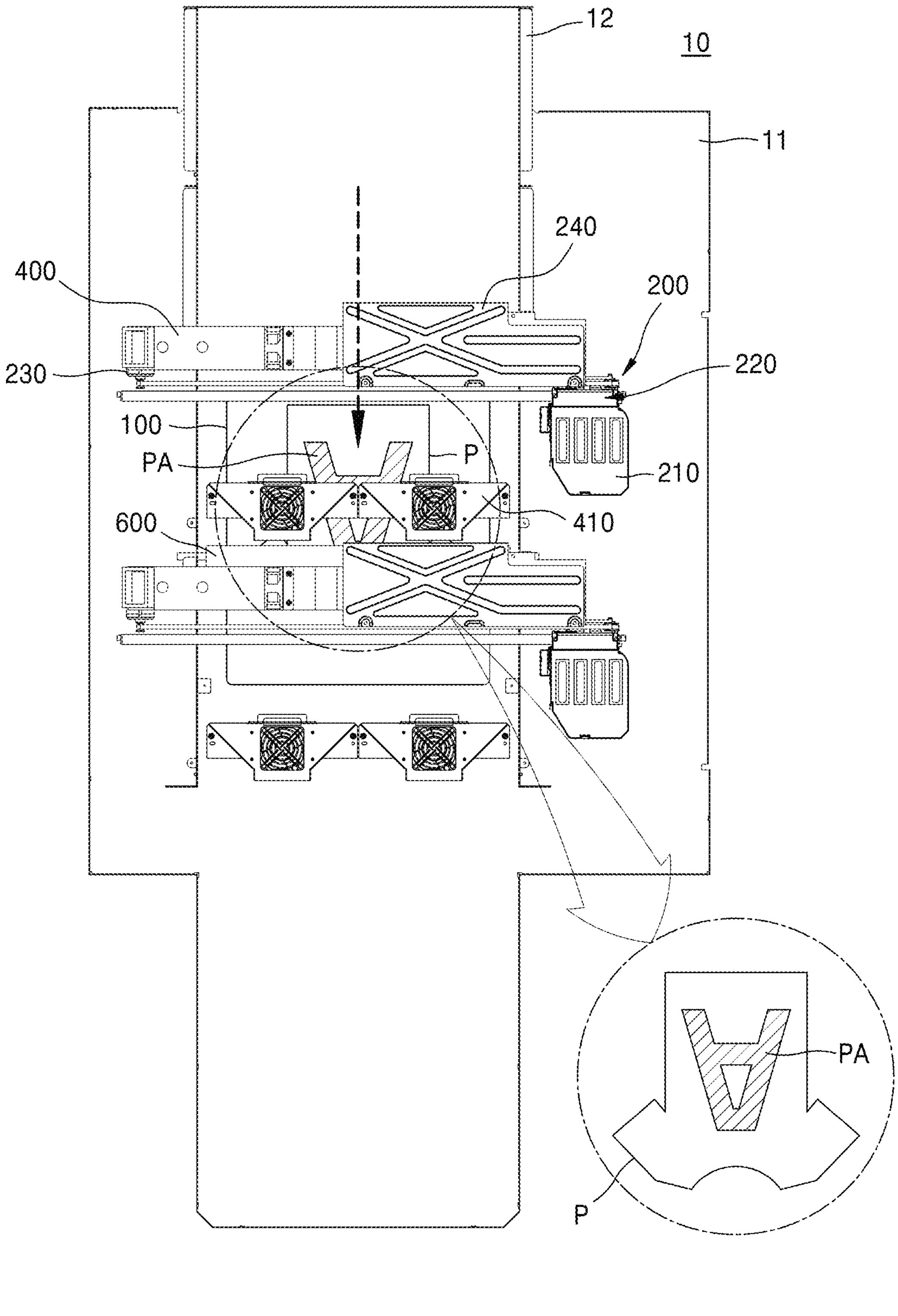
FIG. 5 is a view for explaining an operation of jetting a base ink onto a print medium in an inkjet printing apparatus according to an embodiment.

FIG. 3 is a flowchart of a method of controlling an inkjet printing apparatus, according to an embodiment. FIG. 4 is a view for explaining an operation of moving a flat-bed to a start position in an inkjet printing apparatus, according to an embodiment. FIG. 5 is a view for explaining an operation of jetting a base ink onto a print medium in an inkjet printing apparatus according to an embodiment.

Figure 6:
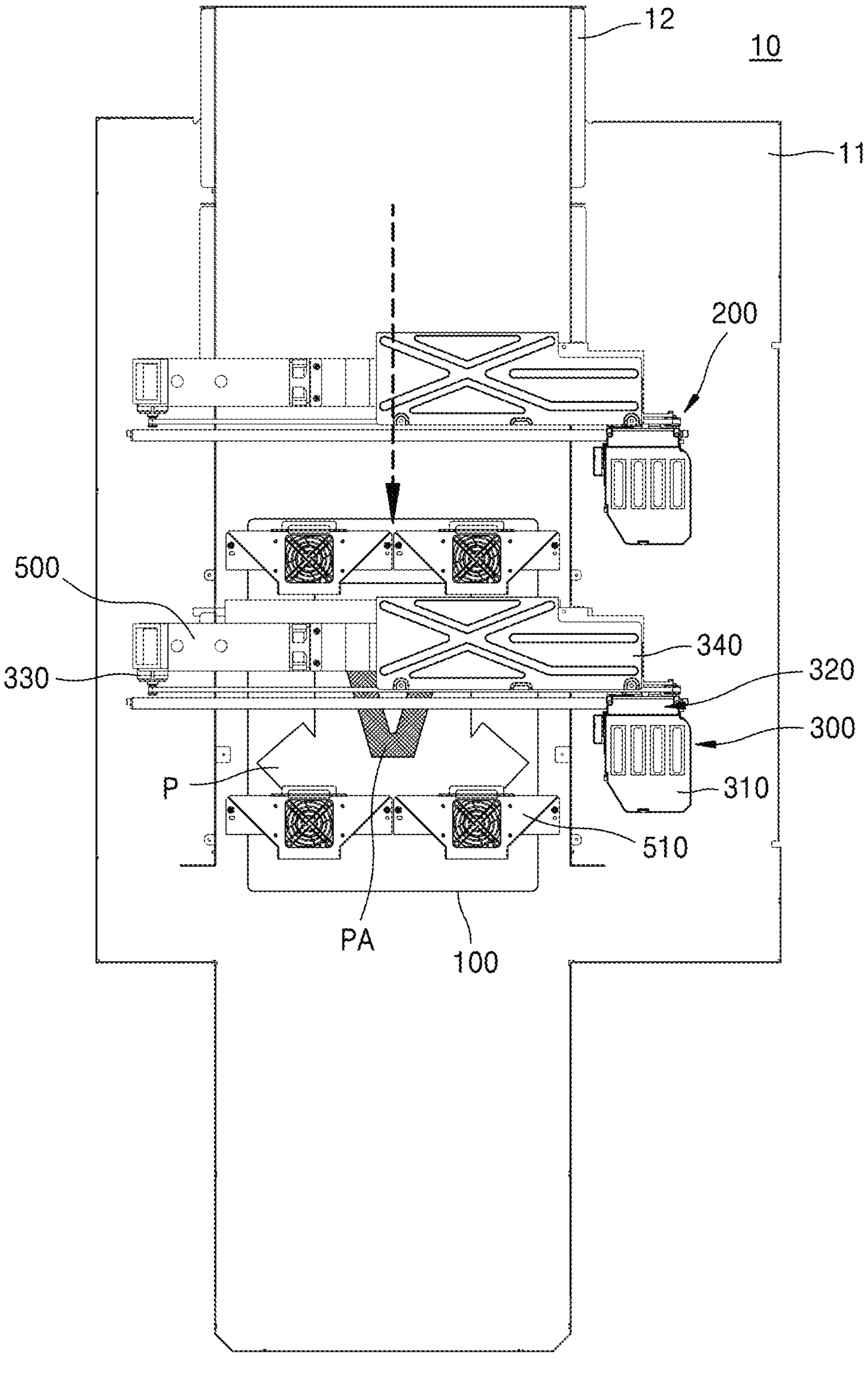
FIG. 6 is a view for explaining an operation of jetting an activator ink onto a print medium in an inkjet printing apparatus according to an embodiment.
Figure 7:
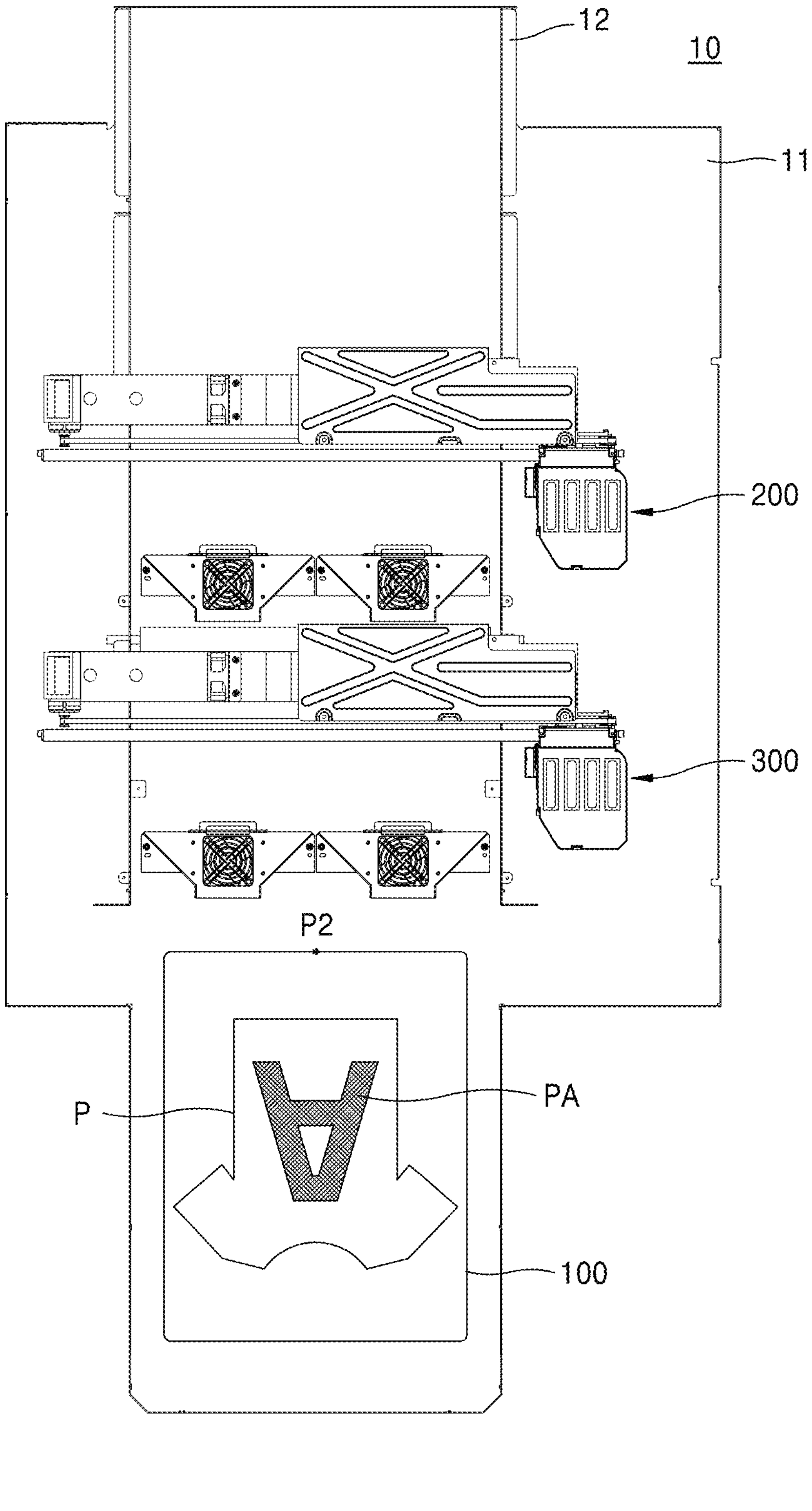
FIG. 7 is a view showing a state in which an image is printed on a print medium.

Furthermore, FIG. 6 is a view for explaining an operation of jetting an activator ink onto a print medium in an inkjet printing apparatus according to an embodiment. FIG. 7 is a view showing a state in which an image is printed on a print medium.

In the following description, the operations to control the inkjet printing apparatus 10 of FIG. 3 are described with reference to the constituent elements of the inkjet printing apparatus 10 of FIGS. 4 to 7. At least one of the constituent elements of the inkjet printing apparatus 10 of FIGS. 4 to 7 may be substantially the same as or similar to the constituent elements of the inkjet printing apparatus 10 of FIG. 1 and/or FIG. 2, and a redundant description thereof is omitted.

Referring to FIGS. 3 and 4, in operation 301, the inkjet printing apparatus 10 according to an embodiment may move the flat-bed 100 to a first position, for example, $P_1$ of FIG. 4, which is a print start position.

According to an embodiment, at least one processor of the inkjet printing apparatus 10 may move the flat-bed 100 located at a second position, for example, $P_2$ of FIG. 4, to the first position $P_1$, by controlling the operation of the driving portion.

The print medium P may be arranged and fixed on the print side of the flat-bed 100, and the print medium P fixed on the flat-bed 100 may move with the flat-bed 100 to the first position $P_1$. In this state, the print medium P may be arranged such that a print area onto which ink is to be jetted is located in a direction opposite to the print side of the flat-bed 100.

When a user's print start manipulation is input after the flat-bed 100 and the print medium P reach the first position $P_1$, at least one processor of the inkjet printing apparatus 10 may control the operation of the driving portion to move the flat-bed 100 and the print medium P fixed to the print side of the flat-bed 100 at a predetermined speed. For example, the flat-bed 100 and the print medium P may move at a predetermined speed in the first direction from the first position $P_1$ to the second position $P_2$, but the disclosure is not limited thereto.

Referring to FIGS. 3 and 5, in operation 302, the inkjet printing apparatus 10 according to an embodiment may jet the base ink onto a print area PA of the print medium P through the first printing device 200.

When the flat-bed 100 and the print medium P moving from the first position $P_1$ in the first direction reaches the first printing device 200, at least one processor of the inkjet printing apparatus 10 stops the movement of the flat-bed 100 to stop the print medium P at the first printing device 200.

The inkjet printing apparatus 10 may jet the base ink, through the first inkjet head 210 of the first printing device 200, onto the print area PA of the print medium P that is stopped at the first printing device 200, and the jetted base ink may be fixed on the print area.

According to an embodiment, at least one processor of the inkjet printing apparatus 10 may control the operation of the first motor 230 so that the first inkjet head 210 reciprocates in the second direction. Accordingly, while moving in the second direction, the first inkjet head 210 may jet the base ink at a desired position in the print area PA.

There may be a case in which the base ink mist and/or foreign materials around the first inkjet head 210 may scatter by the first inkjet head 210 in the base ink jetting process, and the base ink mist and/or foreign materials that have occurred may reach the second printing device 300 to clog the nozzle of the second inkjet head 310 or cause breakdown of the inkjet printing apparatus 10.

Accordingly, at least one processor of the inkjet printing apparatus 10 according to an embodiment may control the operation of the first fan located in the first discharge path 400, or the operation of the second fan 410, thereby discharging the mist and/or foreign materials occurring in the base ink jetting process to the outside of the inkjet printing apparatus 10.

When the jetting of the base ink through the first printing device 200 is completed, at least one processor of the inkjet printing apparatus 10 may operate the driving portion to move the flat-bed 100 and the print medium P that are stopped at the first printing device 200 in the first direction again.

In operation 303, before the print medium P that has passed through the first printing device 200 reaches the second printing device 300, the inkjet printing apparatus 10 according to an embodiment may press, through the roller 600, the print area PA of the print medium P onto which the base ink is jetted.

According to an embodiment, the roller 600 may be located in a region between the first printing device 200 and the second printing device 300 and may press the print area PA of the print medium P that passes through the roller 600.

As the print area PA of the print medium P is pressed by the roller 600, the print area PA of the print medium P is kept flat so that the activator ink is jetted onto a flat surface, and in operation 302, the jetted base ink may be fixed on the print area PA of the print medium P.

The flat-bed 100 and the print medium P that have passed through the roller 600 may move in a state of being a flat surface in the direction toward the second printing device 300. However, according to embodiments, the roller 600 may be omitted in the inkjet printing apparatus 10, and in this case, the operation 303 may also be omitted.

According to another embodiment, the roller 600 may be located upstream of the first printing device 200 to press the print area PA of the print medium P onto which the base ink is jetted.

In an embodiment, at least one processor of the inkjet printing apparatus 10 may move the flat-bed 100 that has passed through the first printing device 200 again in a direction toward the upstream of the first printing device 200. For example, the flat-bed 100 that has passed through the first printing device 200 may move again in a direction toward the first position $P_1$, and as the flat-bed 100 moves, the print medium P may also move in the direction toward the first position $P_1$.

The print medium P that moves in the direction toward the first position $P_1$ may pass through the roller 600 located upstream of the first printing device 200, and press the print area PA of the print medium P that passes through the above-described roller 600. As the print area PA of the print medium P onto which the base ink is jetted is pressed by the roller 600, in operation 302, the jetted base ink may be firmly fixed on the print area PA. At least one processor of the inkjet printing apparatus 10 may move the flat-bed 100 and the print medium P that have passed through the roller 600 in the first direction again, and the flat-bed 100 and the print medium P that have passed through the first printing device 200 again may move in the direction toward the second printing device 300.

Referring to FIGS. 3, 5, and 6, in operation 304, the inkjet printing apparatus 10 according to an embodiment may jet the activator ink, through the second printing device 300, onto the print area PA of the print medium P onto which the base ink has been jetted.

When the flat-bed 100 and the print medium P reaches the second printing device 300, at least one processor of the inkjet printing apparatus 10 may stop the print medium P at the second printing device 300 by stopping the movement of the flat-bed 100.

The inkjet printing apparatus 10 may jet the activator ink, through the second inkjet head 310 of the second printing device 300, onto the print area PA of the print medium P that is stopped at the second printing device 300.

The activator ink jetted from the second inkjet head 310 may be chemically bonded to the base ink that has been jetted onto the print area PA, and thus, an image, for example, an image of an alphabet A shape of FIG. 6, may be printed in the print area PA of the print medium P.

According to an embodiment, at least one processor of the inkjet printing apparatus 10 may control the second inkjet head 310 to reciprocate in the second direction by controlling the operation of the second motor 330. Accordingly, while moving in the second direction, the second inkjet head 310 may jet the activator ink at a desired position in the print area PA.

When an image is printed on dark clothing or fabric, the inkjet printing apparatus 10 according to an embodiment may jet the base ink onto the print area PA of the print medium P through the first printing device 200 and then jet white activator ink first through the second printing device 300.

The white activator ink jetted in the print area PA is chemically bonded to the base ink that has already jetted in a print area of clothing or fabric, thereby forming a background.

After a background is formed in the print area PA in the above-described process, the second printing device 300 may jet activator ink of CYMK colors, and the activator ink of CYMK colors may be chemically bonded to the base ink jetted onto the print area of the print medium P, and thus, an image having a certain color may be printed in the print area of the print medium P.

In other words, when the inkjet printing apparatus 10 according to an embodiment prints an image on the print medium P of a dark color, a background is formed by first jetting white activator ink thereon, and then, by jetting the activator ink of CYMK color thereon, excellent color development may be secured even when an image is printed on the print medium P of a dark color.

There may be a case in which the activator ink mist and/or the foreign materials around the second inkjet head 310 scatter by the second inkjet head 310 in the activator ink jetting process, and the base ink mist and/or the foreign materials that have occurred may reach the first printing device 200 to clog the jetting nozzle of the first inkjet head 210 or cause breakdown of the inkjet printing apparatus 10.

Accordingly, at least one processor of the inkjet printing apparatus 10 according to an embodiment may control the operation of the third fan located in the second discharge path 500, or the operation of the fourth fan 510, so that the mist and/or foreign materials occurring in the activator ink jetting process are discharged to the outside of the inkjet printing apparatus 10.

When the jetting of the activator ink by the second printing device 300 is completed, at least one processor of the inkjet printing apparatus 10 may operate the driving portion to move the flat-bed 100 and the print medium P that are stopped at the second printing device 300 to the second position $P_2$, and then printing may be completed as a user or operator collects the print medium P that has reached the second position $P_2$.

In the inkjet printing apparatus 10 according to the above-described one or more embodiments, through the above-described operations 301 to 304, without performing a pre-treatment, an image may be printed on the print medium P by using the chemical bond between the base ink and the activator ink.

Furthermore, in the inkjet printing apparatus 10 according to the above-described one or more embodiments, as the jetting process of the base ink and the activator ink is dualized, the occurrence of an unintended chemical bond between the base ink and the activator ink may be prevented, and thus, print quality may be improved, and malfunction or breakdown of the inkjet printing apparatus 10 may be prevented.

In addition, in the inkjet printing apparatus 10 according to the above-described one or more embodiments, as the mist and/or foreign materials occurring in the jetting process of the base ink and/or the activator ink are discharged the outside of the inkjet printing apparatus 10, the nozzle of the first inkjet head 210 or the second inkjet head 310 may be prevented from being clogged by the mist and/or foreign materials.

The method according to the above-described one or more embodiments may be embodied in the form of a recording medium including computer-executable instructions, such as a program module executed by a computer. A computer-readable storage medium may be a useable medium that is accessible by a computer and may include all of the volatile and non-volatile media and separable and inseparable media. Furthermore, the computer-readable medium may include all computer storage media and communication media. The computer storage medium may include all volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanisms, and may also include information transmission media.

According to the inkjet printing apparatuses and the control methods thereof according to one or more embodiments, as the process of jetting ink for printing is dualized, an image may be printed on a print medium without performing a pre-treatment.

Furthermore, according to the inkjet printing apparatuses and the control methods thereof according to one or more embodiments, as the process of jetting ink for printing is dualized, an unintended chemical bond between the base ink and the activator ink may be prevented.

In addition, according to the inkjet printing apparatuses and the control methods thereof according to one or more embodiments, the fastness of an image printed on a print medium may be improved through the chemical bond between the base ink and the activator ink.

The effects according to one or more embodiments are not limited to the above-described effects, and other various effects that are not described in the specification may be clearly understood from the following descriptions by one skilled in the art to which the one or more embodiments belong.

It should be understood that one or more embodiments described herein should be considered in a descriptive sense only and not for purposes of limitation. Descriptions of features or aspects within each embodiment should typically be considered as available for other similar features or aspects in other one or more embodiments. While one or more one or more embodiments have been described with reference to the figures, it will be understood by those of ordinary skill in the art that various changes in form and details may be made therein without departing from the spirit and scope of the disclosure as defined by the following claims.

What is claimed is:

1. An inkjet printing apparatus comprising:

a main frame;

a flat-bed having at least one region on which a print medium is placed, the flat-bed configured to move in a first direction with respect to the main frame;

a first printing device located on a movement path of the flat-bed and comprising a first inkjet head configured to jet base ink onto a print area of the print medium;

a second printing device located on the movement path of the flat-bed and comprising a second inkjet head configured to jet a first activator ink and a second activator ink onto the print area of the print medium onto which the base ink is jetted; and at least one processor electrically connected to the flat-bed, the first printing device, and the second printing device and configured to control operations of the flat-bed, the first printing device, and the second printing device, wherein the base ink is ink of a transparent color and comprises nitric acid calcium, water and surfactant, wherein the first activator ink and the second activator ink are ink of CYMK colors and comprise titan dioxide, a surfactant, an aqueous ammonia solution, acetone, water, solvent, and mixed pigment, and wherein a white image is configured to be printed in the print area of the print medium by a chemical bond between the base ink and the first activator ink, and then a color image is configured to be printed in the print area of the print medium by a chemical bond between the base ink and the second activator ink, without a pre-treatment process.

2. The inkjet printing apparatus of claim 1, wherein the second printing device is arranged apart from the first printing device in the first direction.

3. The inkjet printing apparatus of claim 1, wherein the first printing device further comprises:

a first support configured to support the first inkjet head; and a first motor configured to move the first support in a second direction across the first direction.

4. The inkjet printing apparatus of claim 1, wherein the second printing device further comprises:

a second support configured to support the second inkjet head; and a second motor configured to move the second support in a second direction across the first direction.

5. The inkjet printing apparatus of claim 1, further comprising:

a first discharge path located upstream of the first printing device; and a first fan configured to discharge mist, which occurs in a process in which the first inkjet head jets the base ink, to outside of the inkjet printing apparatus through the first discharge path.

6. The inkjet printing apparatus of claim 5, further comprising a second fan located between the first printing device and the second printing device, and configured to discharge the mist, which occurs in the process in which the first inkjet head jets the base ink, to the outside of the inkjet printing apparatus.

7. The inkjet printing apparatus of claim 6, further comprising:

a second discharge path located upstream of the second printing device; and a third fan configured to discharge mist, which occurs in a process in which the second inkjet head jets the first activator ink and the second activator ink, to the outside of the inkjet printing apparatus through the second discharge path.

8. The inkjet printing apparatus of claim 7, further comprising a fourth fan located downstream of the second printing device, and configured to discharge the mist, which occurs in the process in which the second inkjet head jets the first activator ink and the second activator ink, to the outside of the inkjet printing apparatus.

9. The inkjet printing apparatus of claim 8, wherein the at least one processor comprises:

a first processor located in at least one region of the first printing device, and configured to control the operation of the first printing device, the first fan, and the second fan; and a second processor located in at least one region of the second printing device, and configured to control operations of the second printing device, the third fan, and the fourth fan.

10. The inkjet printing apparatus of claim 9, wherein the first processor is further configured to generate a flow of air toward the first processor by controlling the operation of the first fan or the second fan based on a certain time interval.

11. The inkjet printing apparatus of claim 9, wherein the second processor is further configured to generate a flow of air toward the second processor by controlling the operation of the third fan or the fourth fan based on a certain time interval.

12. The inkjet printing apparatus of claim 9, further comprising:

a first cover member configured to protect the first processor; and a second cover member configured to protect the second processor.

13. The inkjet printing apparatus of claim 1, further comprising a roller configured to press the print area of the print medium onto which the base ink is jetted.

14. A method of controlling an inkjet printing apparatus, the method comprising:

moving, to a first position, a flat-bed having one region on which a print medium is placed;

moving, in a first direction, the flat-bed moved to the first position;

jetting base ink onto a print area of the print medium through a first printing device comprising a first inkjet head, wherein the first printing device reciprocates in a second direction perpendicular to the first direction; and jetting a first activator ink and a second activator ink configured to express a color through chemical bond to the base ink onto the print area of the print medium onto which the base ink is jetted through a second printing device comprising a second inkjet head, wherein the second printing device reciprocates in the second direction, wherein the base ink is ink of a transparent color and comprises nitric acid calcium, water and surfactant, wherein the first activator ink and the second activator ink are ink of CYMK colors and comprise titan dioxide, a surfactant, an aqueous ammonia solution, acetone, water, solvent, and mixed pigment, and wherein a white image is printed in the print area of the print medium by a chemical bond between the base ink and the first activator ink, and then a color image is printed in the print area of the print medium by a chemical bond between the base ink and the second activator ink, without a pre-treatment process.

15. The method of claim 14, further comprising, before the jetting of the first activator ink and the second activator ink onto the print area of the print medium, pressing, through a roller, the print area of the print medium onto which the base ink is jetted.

16. The method of claim 14, further comprising discharging mist, which occurs in a process in which the first printing device jets the base ink, to outside of the inkjet printing apparatus by controlling an operation of a first fan located upstream of the first printing device or an operation of a second fan located downstream of the first printing device.

17. The method of claim 14, further comprising discharging mist, which occurs in a process in which the second printing device jets the first activator ink and the second activator ink, to outside of the inkjet printing apparatus by controlling an operation of a third fan located upstream of the second printing device or an operation of a fourth fan located downstream of the second printing device.

18. An inkjet printing apparatus comprising:

a main frame;

a flat-bed having at least one region on which a print medium is placed, the flat-bed configured to move in a first direction with respect to the main frame;

a first printing device located on a movement path of the flat-bed and comprising a first inkjet head configured to jet base ink onto a print area of the print medium;

a second printing device located on the movement path of the flat-bed and comprising a second inkjet head configured to jet activator ink configured to express CYMK colors through chemical bond to the base ink onto the print area of the print medium onto which the base ink is jetted; and at least one processor electrically connected to the flat-bed, the first printing device, and the second printing device and configured to control operations of the flat-bed, the first printing device, and the second printing device, wherein the base ink is ink of a transparent color and comprises nitric acid calcium, water and surfactant, wherein the activator ink is ink of CYMK colors and comprises titan dioxide, a surfactant, an aqueous ammonia solution, acetone, water, solvent, and mixed pigment, and wherein a color image is configured to be printed in the print area of the print medium by a chemical bond between the base ink and the activator ink without a pre-treatment process.

19. An inkjet printing apparatus comprising:

a main frame;

a flat-bed having at least one region on which a print medium is placed, the flat-bed configured to move in a first direction with respect to the main frame;

a first printing device located on a movement path of the flat-bed and comprising a first inkjet head configured to jet base ink onto a print area of the print medium;

a second printing device located on the movement path of the flat-bed, arranged apart from the first printing device in the first direction and comprising a second inkjet head configured to jet activator ink configured to express a color through chemical bond to the base ink onto the print area of the print medium onto which the base ink is jetted; and at least one processor electrically connected to the flat-bed, the first printing device, and the second printing device and configured to control operations of the flat-bed, the first printing device, and the second printing device, wherein the base ink is ink of a transparent color and comprises nitric acid calcium, water and surfactant, wherein the activator ink is ink of CYMK colors and comprises titan dioxide, a surfactant, an aqueous ammonia solution, acetone, water, solvent, and mixed pigment, and wherein a color image is configured to be printed in the print area of the print medium by a chemical bond between the base ink and the activator ink when the activator ink is jetted after the base ink is jetted onto the print area of the print medium, without a pre-treatment process.

* * * * *